2,764,496

FINGER PAINTING COMPOSITION

Max R. Vogel and Bernhard J. Mellwig, Easton, Pa., assignors to Binney & Smith Inc., a corporation of Delaware No Drawing. Application April 3, 1952,
Serial No. 280,358

1 Claim. (Cl. 106—158)

The present invention relates particularly to a composition for finger painting.

In finger painting, the dry painting composition is sprinkled onto a wet sheet of paper, which paper preferably has a dull side and a glazed side. The artist then spreads the painting composition around with his fingers or other parts of his hands and forearm to achieve novel artistic designs. Such a method of painting has particular educational value where employed by children.

Heretofore, finger paints have been sold in paste form. Unless packed in air-tight tubes, pastes have the decided disadvantage of caking as the composition dries. When this occurs, the painting composition cannot be restored to its necessary homogeneity and consistency, even though water is added. Furthermore, the paste will be rendered useless if the tube is exposed to freezing temperatures.

It is a principal object of the present invention to provide a finger painting composition which is in powder form and remains so until ready for use, at which time the composition is readily and easily sprinkled onto a wet paper to produce a painting medium for the artist's immediate use.

It is a further object of the present invention to provide a finger painting composition which is innocuous. With such a painting composition, there is no danger of children being harmed in the event they should put the paint in their mouths.

A still further object of the present invention is to provide a finger painting composition which is readily washable so that it does not stain the clothing and hands of the user.

Other objects and advantages of the present invention will become more apparent as it is described in detail below.

In accordance with our invention we have produced a finger painting composition in powder form which is innocuous and washable comprising winter wheat flour, sodium alginate, beta naphthol, sodium carboxy methyl cellulose and a pigment.

Below is a basic formula for our novel powder paint:

EXAMPLE 1

| Ingredients: | Parts by weight |
|---|---|
| Soft winter wheat flour | 110 |
| Sodium alginate | 10 |
| Beta naphthol | 2 |
| Sodium carboxy methyl cellulose | 3 |
| Pigment | 6 to 39 |

As indicated in Example 1, the bulk of the mixture comprising the paint powder is represented by flour. However, ordinary flour is unsatisfactory because its particles are coarse and abrasive. The flour employed must have a very fine and smooth texture, i. e., 95% of any portion of the flour must be able to pass through a 150 mesh screen. Although not essential to our invention, it is further desirable that the flour have an ash value of 0.46–0.49% and contain 8.5–8.9% protein. In this connection, we have found that soft winter wheat flour is ideal for our purposes.

By employing a protective colloid such as a sodium derivative of algin, e. g. sodium alginate, we have found that the painting composition has a permanent quality after application to the wet paper. The sodium alginate used in the painting composition should preferably be powdered and of the medium viscosity type.

Beta naphthol is incorporated into the painting composition as a preservative so that the powdered paint will not decompose.

Sodium carboxy methyl cellulose is added because of its well known properties as a thickener, stabilizer, adhesive and protective colloid.

The color that is used can be any suitable non-toxic pigment. The choice of such a pigment would depend upon the strength and shade desired. Such choice would, of course, be a mere expedient to any one well versed in this field.

In manufacturing the powder finger paint, the dry ingredients are merely blended and ground in a micro pulverizer which employs a ⅛″ screen. The paint is then packed in suitable sifter top containers for shipment and distribution.

We have also found that the painting composition disclosed in Example 1 may be modified slightly by the incorporation of an additional ingredient so as to improve its painting properties. In this modified form, which is shown below as Example 2, we add colloidal bentonite which prevents distortion of the design during the painting and drying stages.

EXAMPLE 2

| Ingredients: | Parts by weight |
|---|---|
| Soft winter wheat flour | 110 |
| Sodium alginate | 10 |
| Beta naphthol | 2 |
| Sodium carboxy methyl cellulose | 3 |
| Colloidal bentonite | 10 |
| Pigment | 6 to 39 |

In another form of the present invention, the powder painting composition is made by combining a base mix and finishing mix. The formula for this particular composition is shown in the following example:

EXAMPLE 3

*Base mix*

| Ingredients: | Parts by weight |
|---|---|
| Soft winter wheat flour | 10 |
| Pigment | 72 |
| Carbowax 6000 | 8 |
| Beta naphthol | 4.5 |
| Condensed naphthalene formaldehyde sulfonate | 2 |

*Finishing mix*

| | |
|---|---|
| Soft winter wheat flour | 110 |
| Dextrine | 16 |

Each mix is blended and pulverized individually with a micro pulverizer having a ⅛″ screen, and then both mixes are combined and likewise blended and pulverized.

We have found that Carbowax 6000, a water soluble wax comprising solid polyethylene glycol, prevents curling of the drawing paper after the paint is dried. It also imparts flexibility to the finished painting so that the painting can be rolled or folded without cracking or peeling.

In order to diminish the tendency of the flour to lump and roll into small nodules so that the finished painting may have a grain-like texture, we have added a wetting and dispersing agent comprising condensed naphthalene formaldehyde sulfonate.

By utilizing a dextrine, preferably potato dextrine though other types are suitable, the flour will have additional binding strength so that a final dry paint film of extraordinary strength will be produced.

A still further form of the present invention is shown in the formula below:

EXAMPLE 4

| Ingredients: | Parts by weight |
|---|---|
| White corn dextrine | 110 |
| Yellow corn dextrine | 3.5 |
| Pigment | 20 to 70 |
| Beta naphthol | 2 |
| Sodium alginate | 10 |

It is to be noted that white corn dextrine is the base ingredient rather than soft winter wheat flour. The white corn dextrine has the same physical properties as soft winter wheat flour with respect to texture. The ingredients are blended and mixed in the manner described above.

When it is desired to use our finger painting composition, the various dry colors are sprinkled directly from the container onto the glazed side of a wet sheet of paper. The artist then wets his hand and mixes and blends the painting composition to the desired shade. He then begins to paint using the finger tips and other parts of the hand and forearm.

It is to be expressly understood that the ratio of ingredients shown in the above formulae may be reasonably departed from and that equivalent materials may be substituted for each of the ingredients in the formulae without effecting the scope of the present invention as defined in the claim.

Having thus described our invention, we claim:

A finger painting composition in powder form which is innocuous and washable comprising winter wheat flour, beta naphthol, sodium alginate, sodium carboxy methyl cellulose, colloidal bentonite, and a pigment.

References Cited in the file of this patent

UNITED STATES PATENTS

| 816,648 | Cornelison | Apr. 3, 1906 |
| 1,399,336 | Cole | Dec. 6, 1921 |
| 1,633,500 | Serchi | June 21, 1927 |
| 2,180,152 | Kohler | Nov. 14, 1939 |
| 2,190,372 | Adams | Feb. 13, 1940 |
| 2,260,882 | Berg | Oct. 28, 1941 |

FOREIGN PATENTS

| 897,518 | France | Mar. 23, 1945 |